United States Patent Office 3,271,455
Patented Sept. 6, 1966

3,271,455
PROCESS FOR SEPARATING METHYLAMINES
Denys Cook and David M. Young, Sarnia, Ontario, Canada, assignors to The Dow Chemical Company, Midland, Mich., a corporation of Delaware
No Drawing. Filed Sept. 22, 1961, Ser. No. 139,863
2 Claims. (Cl. 260—583)

This invention relates to a process for separating a mixture of methylamines.

More particularly, the invention relates to a process for separating monomethylamine, dimethylamine and trimethylamine from mixtures containing two or more of these amines and optionally containing other components which are inert under the conditions of the novel process.

There are numerous known processes for the separation of monomethylamine or dimethylamine, or both from trimethylamine. However, most of these known processes involve separation of the amines by fractional distillation. This technique is troublesome because of the formation of azeotropes between monomethylamine and trimethylamine and between dimethylamine and trimethylamine.

However, it has now been found that mixtures containing any two or all three of the methylamines can be separated into the component amines wherein each component contains a high proportion of a given amine and minor proportions of the other amines.

In the process of the present invention the composition containing the mixture of amines is brought into contact with a borate ester having the formula:

wherein R is the lower alkyl or phenyl radical and, preferably, an alkyl group having from 1 to 4 carbon atoms; the term "lower alkyl" is intended to include alkyl groups having from 1 to 12 carbon atoms. The process can be conducted at a temperature between the freezing point of the mixture and 100 C. The borate ester combines with monomethylamine and with dimethylamine to form borate-amine adducts, usually in the form of solid crystals. The borate esters will not form adducts with trimethylamine at least until all of the monomethylamine and/or dimethylamine has been converted into the adducts. The borate-amine crystal adducts of monomethylamine and/or dimethylamine are then separated from any liquid phase, conveniently by filtration or decantation. The monomethylamine and/or dimethylamine can be conveniently isolated from the crystal adducts by warming the crystals to a sufficiently high temperature to cause evolution of the amine; usually, heating to about room temperature is sufficient. Alternatively, the crystals may be dissolved in a suitable solvent, such as methanol, and the amine recovered from the methanolic solution. Trimethylamine, when present in the liquid phase after separation of the borate-amine crystals, can be held therein until ready for use or can be evolved with mild heating.

Where monomethylamine and dimethylamine are both present in the original mixture, in addition to trimethylamine, the monomethyl- and dimethylamine, after decomposition of the adducts to liberate the amines, may be separated by conventional means, such as fractional distillation.

In another embodiment of the invention, the trimethylamine may be conveniently separated by distillation from the mixture containing the trimethylamine in the liquid or gaseous phase and the crystalline borate-amine adducts of monomethylamine and/or dimethylamine.

In still another embodiment of the invention an alkyl borate-containing azeotrope may be used instead of an alkyl or phenyl borate per se. For example, trimethyl borate-methanol azeotropes have been found to be excellent sources of trimethyl borate for carrying out the novel process. The borate-amine adduct formed from a trimethyl borate-methanol azeotrope and a mixture of dimethylamine and trimethylamine possesses greater stability than a similar adduct prepared from trimethyl borate alone; see Example IV of this specification.

In carrying out the process of the present invention, it is preferable to employ a ratio of about one mole of borate ester per mole of monomethyl- and dimethylamine used, although ratios markedly variant from this will result in at least partial separation of the component amines. If an excess of amine is present all of the monomethyl- and/or dimethylamine will not be combined as the borate-amine adduct, while if an excess of borate ester is used, the excess ester may dissolve at least a portion of the adduct.

The preferred temperature for the formation of the borate-amine adduct depends upon the particular borate ester employed. For example, when using trimethyl borate to separate a mixture of dimethyl- and trimethyl amine, the preferred temperature is about −15° C.; when using triethyl borate to separate the same mixture, the preferred temperature is about −25° C.

It is to be understood that the alkyl and triphenyl borate ester disclosed as a reactant in the novel process may contain one or more of the various substituents that are inert under the conditions of the process, such as, for example, chloro-, bromo-, iodo- and nitro-substituents.

The practice of the present invention is illustrated by the following examples.

*Example I*

A metal vessel equipped with a closure device was charged with 151 grams (4.9 gram-moles) of monomethylamine and 236 grams (4.0 gram-moles) of trimethylamine. The mixture was then allowed to come to equilibrium at, successively, 10°, 25° and 39° C., the mixture being sampled at each temperature and the vapor phase analyzed by gas-liquid chromatography. Then 452 grams (4.3 gram-moles) of trimethyl borate were added to the vessel, the mixture was allowed to come to equilibrium at 10°, 25° and 39° C., successively, and the equilibrium vapor phase was sampled at each temperature and the samples analyzed. There are shown in Table I the proportions of monomethylamine and trimethylamine detected in the vapor phase at each of the three temperatures, before and after the addition of the trimethyl borate.

TABLE I

| Temp., ° C. | Vapor Phase Composition, Weight Percent | | | |
| --- | --- | --- | --- | --- |
| | Without Trimethyl Borate | | With Trimethyl Borate | |
| | Monomethyl-amine | Trimethyl-amine | Monomethyl-amine | Trimethyl-amine |
| 10 | 33.7 | 66.3 | 2.9 | 97.1 |
| 25 | 46.7 | 53.3 | 0.6 | 99.4 |
| 39 | 52.9 | 47.1 | 16.6 | 83.4 |

Examples II–IV

In each of three examples, an equimolar mixture of dimethylamine and trimethylamine was treated with an alkyl borate or borate-containing azeotrope, as designated, cooling being applied either before or after the addition of the borate; the dimethylamine-containing adduct was separated from the liquid phase by decantation of the liquid and the liquid phase was analyzed by infrared spectroscopy. The adduct was warmed to about room temperature and the evolved gases were analyzed to determine the dimethylamine content, except where the borate used was a trimethyl borate-methanol azeotrope; in this instance the crystalline adduct was dried under slightly reduced pressure, dissolved in methanol and the methanolic solution distilled to remove the azeotrope; the remaining methanolic solution was then analyzed for dimethylamine. There are shown in Table II for each example, the weights of amines and alkyl borate or borate-methanol azeotrope used and the amount, the temperature at which the adduct formed, and the amount of amine determined.

TABLE II

| Example No. | Starting Materials | | | | Temp., °C. | Amount Determined | |
|---|---|---|---|---|---|---|---|
| | Dimethyl-amine, Amount, g. | Trimethyl-amine, Amount, g. | Alkyl Borate | | | Dimethyl-amine in Solid Phase, mole percent | Trimethyl-amine in Liquid Phase, mole percent |
| | | | Type | Amount, g. | | | |
| 2 | 20 | 26 | Trimethyl | 46 | −15 | 95 | 72 |
| 3 | 15 | 20 | Triethyl | 53 | −28 | 77 | 78 |
| 4 | 27 | 35 | Trimethylborate-methanol azeotrope. | ¹88 | 0 | >95 | 85 |

¹ This azeotrope contained 75.8 percent by weight of trimethyl borate.

Example V

A metal vessel equipped with a closure device was charged with 724 grams (23.4 moles) of monomethylamine, 996 grams (22.2 moles) of dimethylamine and 970 grams (16.5 moles) of trimethylamine. The mixture was allowed to come to equilibrium at 25° C. and then at 39° C., the vapor in equilibrium with the liquid phase being sampled at both temperatures and the samples analyzed by gas-liquid chromatography. Then 6580 grams of trimethyl borate were added to the vessel, the mixture allowed to come to equilibrium at 25° C. and then at 39° C., and the vapor phase at each temperature sampled and the samples analyzed. There are shown in Table III the proportions of each of the amines in the vapor phase at both temperatures, before and after the addition of the trimethyl borate.

TABLE III

| Temp., °C. | | Vapor Phase Composition, Weight Percent | |
|---|---|---|---|
| | | Without Trimethyl Borate | With Trimethyl Borate |
| 25 | Monomethylamine | 32.2 | nil |
| | Dimethylamine | 29.0 | 36.5 |
| | Trimethylamine | 38.8 | 63.5 |
| 39 | Monomethylamine | 66.6 | 32.3 |
| | Dimethylamine | 7.1 | 13.4 |
| | Trimethylamine | 26.3 | 54.3 |

The embodiments of the invention in which an exclusive property or privilege is claimed are defined as follows:

1. A process for separating trimethylamine from mixtures containing trimethylamine and at least one other methylamine, comprising adding to said mixture at least about one mole of a lower alkyl borate ester per mole of other methylamines present in the mixture, thus to convert a major portion of said other amines to amine-borate adducts and separating the trimethylamine from said adducts.

2. A process as in claim 1 wherein the borate ester is added in the form of an alkyl borate-methanol azeotrope.

References Cited by the Examiner

Goubeau et al., Z. Anorg. U. allgem. Chem., vol. 267, pp. 27–37 (1952).

Horn et al., Jour. Am. Chem. Soc., vol. 78, pp. 5772–5773 (1956).

CHARLES B. PARKER, *Primary Examiner.*

LEON ZITVER, *Examiner.*

MUZIO B. ROBERTO, ANTON H. SUTTO,
*Assistant Examiners.*